US008686701B2

(12) United States Patent
Ting

(10) Patent No.: US 8,686,701 B2
(45) Date of Patent: Apr. 1, 2014

(54) ACTIVE WIRE COMPENSATION CIRCUIT AND CONTROLLER WITH THE SAME

(75) Inventor: Ming Chiang Ting, Hsinchu (TW)

(73) Assignee: Analog Vision Technology Inc., New Taipei (TW)

( * ) Notice: Subject to any disclaimer, the term of this patent is extended or adjusted under 35 U.S.C. 154(b) by 85 days.

(21) Appl. No.: 13/104,958

(22) Filed: May 10, 2011

(65) Prior Publication Data

US 2012/0062195 A1 Mar. 15, 2012

(30) Foreign Application Priority Data

Sep. 15, 2010 (TW) .............................. 99131116 A

(51) Int. Cl.
*H02M 3/156* (2006.01)
(52) U.S. Cl.
USPC .......................................... 323/282; 323/285
(58) Field of Classification Search
USPC ......... 323/234, 271, 281, 282, 284, 285, 351, 323/312–316
See application file for complete search history.

(56) References Cited

U.S. PATENT DOCUMENTS

| 6,181,120 B1* | 1/2001 | Hawkes et al. ............... 323/282 |
| 6,680,604 B2* | 1/2004 | Muratov et al. ............... 323/285 |
| 8,093,875 B2* | 1/2012 | Sun ................................ 323/281 |
| 2006/0125455 A1* | 6/2006 | Tiew et al. .................... 323/282 |
| 2009/0058377 A1* | 3/2009 | Ting ............................... 323/234 |
| 2011/0031948 A1* | 2/2011 | Chien et al. .................. 323/282 |

* cited by examiner

*Primary Examiner* — Timothy J Dole
*Assistant Examiner* — Ivan Laboy Andino
(74) *Attorney, Agent, or Firm* — Li & Cai Intellectual Property (USA) Office

(57) ABSTRACT

An active wire compensation circuit, adapted to compensate a level of an output voltage detecting signal, is disclosed. A feedback controller controls a converting circuit according to the compensated output voltage detecting signal to have a load voltage for driving a load stabilized at a predetermined voltage level. The active wire compensation circuit comprises a compensating unit and a feedback compensating unit. The compensating unit detects the load current flowing through the load and accordingly generates a compensating current. The feedback compensating unit modulates the level of the output voltage detecting signal according to the compensating current and generates the compensated output voltage detecting signal.

4 Claims, 2 Drawing Sheets

ACTIVE WIRE COMPENSATION CIRCUIT AND CONTROLLER WITH THE SAME

BACKGROUND OF THE INVENTION (1) Field of the Invention

This invention relates to an active wire compensation circuit and a controller with the same, and more particularly relates to an active wire compensation circuit, which modulates the feedback signal by using a compensating current, and a controller with the same.

(2) Description of the Prior Art

FIG. 1 is a circuit diagram of a typical DC-to-DC buck converter. As shown, the DC-to-DC buck converter has a converting circuit 10, a controller 20, a load 30, and an output voltage detecting circuit 12. The output voltage detecting circuit 12 detects an output voltage Vo of the converting circuit 10 so as to generate an output voltage detecting signal Vfb. The controller 20 controls the operation of the converting circuit 10 according to the output voltage detecting signal Vfb such that the converting circuit 10 is capable to transform an input voltage Vin into the output voltage Vo maintained at a predetermined voltage level. However, since the output of the DC-to-DC buck converter is supplied to the load 30 through a wire 14 showing a parasitic resistor Rw, there must be some voltage loss Vw on the wire 14, which equals two times the parasitic resistor Rw times the current IL through the load 30. Thus, the load voltage Vo' received by the load 30 would be lower than the output voltage Vo from the converting circuit 10.

To compensate the power loss on the wire 14, as shown in FIG. 2, a typical solution is to connect a detecting wire 16 between the output voltage detecting circuit 12 and the load 30 to remote sense the load voltage Vo' for feedback control. That is, the detecting wire 16 is connected to the power supply end of the load 30 for executing feedback control. This method may compensate half the voltage loss on the wire 14, which equals the parasitic resistor Rw times the load current IL. However, the additional detecting wire 16 for remote sense increases the circuit cost. In addition, as the power transmission distance increases, the length of the detecting wire 16 must be extended.

SUMMARY OF THE INVENTION

According to the above mentioned problems, the present invention modulates the level of the output voltage detecting signal by using the current detected on the load so as to compensate the power loss on the wire and stabilize the load voltage at a predetermined level. Therefore, a precise load voltage with the power loss on the wire being properly compensated can be provided without the need of using the detecting wire for remote sensing the load voltage.

To achieve the above mentioned object, an active wire compensation circuit is provided in the present invention. The active wire compensation circuit is utilized for compensating a level of an output voltage detecting signal, which is delivered to a feedback controller to control a converting circuit so as to have a load voltage received by a load stabilized at a predetermined voltage level. The active wire compensation circuit has a compensating unit and a feedback compensating unit. The compensating unit is utilized for detecting a load current and generating a compensating current accordingly. The feedback compensating unit modulates the level of the output voltage detecting signal according to the compensating current and outputs the compensated output voltage detecting signal for feedback control.

A controller with active wire compensation is also provided in accordance with an embodiment of the present invention. The controller is utilized for controlling a converting circuit to transform an input voltage into an output voltage for driving a load. The controller with active wire compensation has an active wire compensation circuit and a feedback control circuit. The active wire compensation circuit receives an output voltage detecting signal responsive to the output voltage and generates a compensating current according to a load current through the load to compensate the output voltage detecting signal. The feedback control circuit generates at least a PWM control signal according to the compensated output voltage detecting signal to control the converting operation of the converting circuit.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
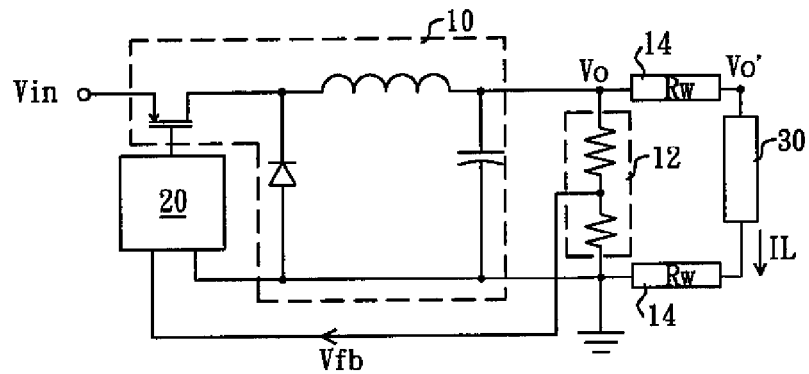
FIG. 1 is a circuit diagram of a typical DC-to-DC buck converter.
Figure 2:
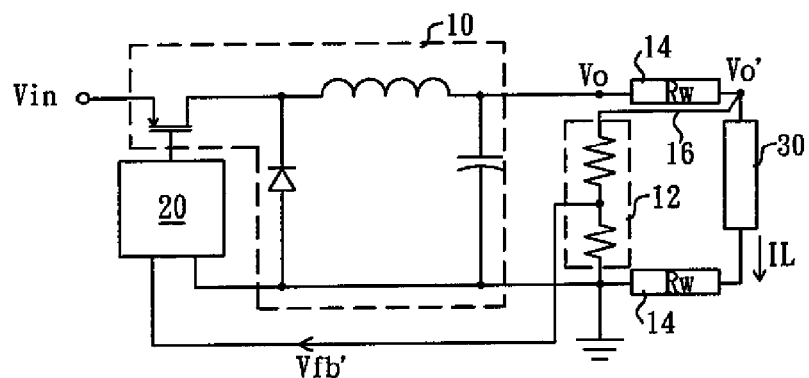
FIG. 2 is a circuit diagram of a typical DC-to-DC buck converter with remote sense for wire compensation.
Figure 3:
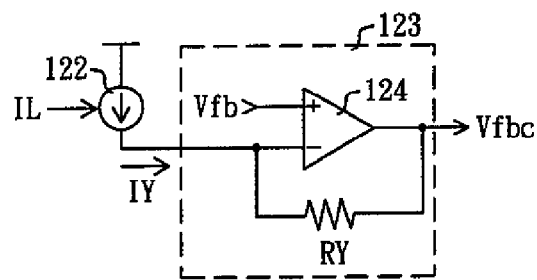
FIG. 3 is a circuit diagram showing an active wire compensation circuit in accordance with a preferred embodiment of the present invention.

FIG. 3 is a circuit diagram showing an active wire compensation circuit in accordance with a preferred embodiment of the present invention. The active wire compensation circuit has a compensating unit 122 and a feedback compensating unit 123 for modulating the voltage level of an output voltage detecting signal Vfb. In the present embodiment, the compensating unit 122 has a current source, which generates a compensating current IY according to a load current IL. The feedback compensating unit 123 has an amplifier 124 and a compensating resistor RY. The amplifier 124 has a non-inverted input receiving the output voltage detecting signal Vfb and an inverted input coupled to the compensating unit 122. A compensating resistor RY is coupled to an output of the amplifier 124 and the inverted input. The compensating current IY flows through the compensating resistor RY and the compensated output voltage detecting signal Vfbc is outputted at the output of the amplifier 124. Since the voltage levels of the inverted input and the non-inverted input of the amplifier 124 would be the same, the relationship between the compensated output voltage detecting signal Vfbc and the output voltage detecting signal Vfb can be described in the equations:

$$Vfbc = Vfb - IY*RY = Vfb - C*IL*RY \quad (1)$$

Wherein, C represents a ratio of the compensating current IY to the load current IL.

The relationship between the output voltage detecting signal Vfb to the output voltage Vo can be described in the equation:

$$Vfb = Vo/Rd \quad (2)$$

Wherein, Rd represents a voltage dividing ratio of an output voltage detecting circuit (not shown).

From the two above mentioned equations, the relation described below can be derived:

$$Vfbc=Vo/Rd-C*IL*RY \rightarrow$$

$$Vo=Vfbc*Rd+C*IL*RY*Rd \quad (3)$$

In the above mentioned equation (3), C*IL*RY*Rd can be regarded as a compensating value for the feedback controller to adjust the level of the output voltage Vo so as to have the load voltage Vo' stabilized at a predetermined voltage level. A combination of the active wire compensation circuit in the present invention and a converting circuit with feedback control is described below for a better understanding of how the active wire compensation circuit reaches the object of stabilizing the load voltage Vo'.

Figure 4:
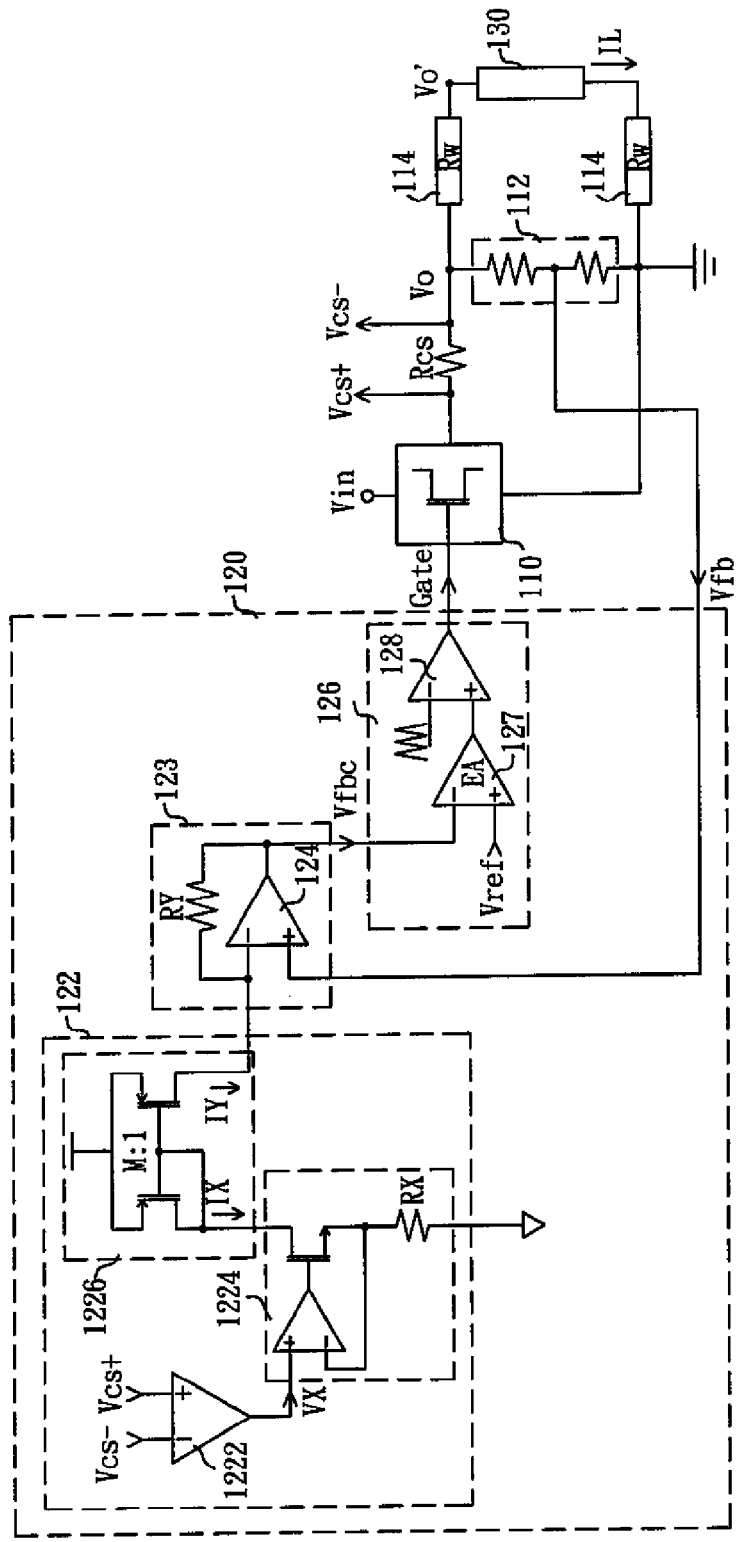
FIG. 4 is a circuit diagram showing a converter with active wire compensation in accordance with a preferred embodiment of the present invention.

FIG. 4 is a circuit diagram showing a convertor with an active wire compensation circuit in accordance with a preferred embodiment of the present invention. The converter has a controller 120 with active wire compensation, a converting circuit 110, a load 130, an output voltage detecting circuit 112, and a load current detecting circuit. The controller 120 controls the converting operation of the converting circuit 110 for transforming an input voltage Vin into an output voltage Vo for driving the load 130. The relationship between the output voltage Vo and the load voltage Vo' received by the load 130 can be described in the equation:

$$Vo'=Vo-2*Rw*IL \quad (4)$$

The controller 120 has an active wire compensation circuit and a feedback control circuit 126. The active wire compensation circuit has a compensating unit 122 and a feedback compensating unit 123. The compensating unit 122 receives two current detecting signals Vcs+ and Vcs− and generates a compensating current IY accordingly. The relationship between the current detecting signals Vcs+ and Vcs− and the load current IL can be described in the equation: Vcs+−Vcs−=IL*Rcs, wherein Rcs represents the resistance of the load current detecting circuit. That is, the compensating unit 122 generates the compensating current IY according to the load current IL. The feedback compensating unit 123 receives the output voltage detecting signal Vfb and the compensating current IY, and generates a compensated output voltage detecting signal Vfbc to the feedback control circuit 126.

The feedback control circuit 126 has an error amplifier 127 and a pulse width modulator 128. The error amplifier 127 receives a reference voltage signal Vref and the compensated output voltage detecting signal Vfbc and generates a pulse width modulating signal accordingly. The pulse width modulator 128 receives a saw signal and the pulse width modulating signal generated by the error amplifier 127 so as to generate a PWM control signal Gate for controlling the converting operation of the converting circuit 110. Since the voltage levels of the two inputs of the error amplifier 127 would be the same (Vref=Vfbc), in combination with the equations (3) and (4), the relation as shown below can be derived:

$$Vfbc*Rd+C*IL*RY*Rd=2*Rw*IL+Vo'$$

$$Vo'=Vref*Rd+IL*(C*RY*Rd-2*Rw)$$

Because the reference voltage signal Vref and the voltage dividing ratio Rd are constant for a given circuit, the load voltage Vo' can be stabilized at a voltage level equals to the reference voltage signal Vref times the voltage dividing ratio Rd if the value C and the compensating resistor RY are adequately adjusted to compensate the power loss on the wire (C*RY*Rd=2*Rw).

The detailed architecture of the compensating unit 122 is described below. The compensating unit 122 has an operational amplifier 1222, a voltage-to-current transformer 1224, and a current mirror 1226. The operational amplifier 1222 receives the current detecting signals Vcs+ and Vcs− from the load current detecting circuit and generates a gain signal VX according to a difference between the two current detecting signals Vcs+ and Vcs−. The voltage-to-current transformer 1224 receives the gain signal VX and generates a gain current IX according to the resistor RX. The current mirror 1226 with a current gain M:1 generates a compensating current IY according to the gain current IX. Since the difference between the two current detecting signals Vcs+ and Vcs− represents the load current IL flowing through the load 130. There shows a relationship between the compensating current IY and the load current IL. Moreover, the gain of the compensating unit 122 (i.e. the relationship between the compensating current IL and the potential difference of the current detecting signal Vcs+ and Vcs−) may be calibrated according to the demand so as to increase the flexibility of choosing the proper load current detecting circuit. Thus, a load current detecting circuit with suitable impedance can be selected to reduce the power loss resulted from the detection of the load current.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. An active wire compensation circuit, for compensating a level of an output voltage detecting signal, which is received by a feedback controller for controlling a converting circuit so as to have a load voltage received by a load being stabilized at a predetermined voltage level, wherein the converting circuit transforms an input voltage into an output voltage, and the output voltage is supplied to the load through a wire to generate the load voltage, the active wire compensation circuit comprising:

a compensating unit, utilized for detecting a load current and generating a compensating current accordingly, wherein the compensating unit has a current source for generating the compensating current according to the load current; and a feedback compensating unit, modulating the level of the output voltage detecting signal according to the compensating current and outputting the compensated output voltage detecting signal accordingly, wherein the feedback compensating unit has an amplifier and a compensating resistor, the amplifier has a non-inverted input receiving the output voltage detecting signal and an inverted input receiving the compensating current, and the compensating resistor is coupled between an output of the amplifier and the inverted input to have the amplifier output the compensated output voltage detecting signal;

wherein the output voltage detecting signal is generated directly from the output voltage.

2. The active wire compensation circuit of claim 1, wherein the compensating unit further comprises a detecting amplifier, the detecting amplifier detects the load current so as to generate an amplified detecting signal, and the current source generates the compensating current according to the amplified detecting signal.

3. A controller with active wire compensation, for controlling a converting circuit to transform an input voltage into an output voltage for driving a load, wherein the output voltage is supplied to the load through a wire to generate a load voltage, the controller with active wire compensation comprising:

an active wire compensation circuit, receiving an output voltage detecting signal responsive to the output voltage and generating a compensating current responsive to a load current through the load to compensate the output voltage detecting signal, wherein the active wire compensation circuit comprises:

a compensating unit, utilized for detecting the load current and generating the compensating current accordingly, wherein the compensating unit has a current source, which generates the compensating current according to the load current; and a feedback compensating unit, modulating a level of the output voltage detecting signal according to the compensating current and outputting the compensated output voltage detecting signal accordingly; and a feedback control circuit, generating at least a PWM control signal according to the compensated output voltage detecting signal to control converting operation of the converting circuit, wherein the feedback compensating unit has an amplifier and a compensating resistor, the amplifier has a non-inverted input receiving the output voltage detecting signal and an inverted input receiving the compensating current, and the compensating resistor is coupled between an output of the amplifier and the inverted input to have the amplifier output the compensated output voltage detecting signal;

wherein the output voltage detecting signal is generated directly from the output voltage.

4. The controller with active wire compensation of claim 3, wherein the compensating unit further comprises a detecting amplifier, the detecting amplifier detects the load current and generates an amplified detecting signal accordingly, and the current source generates the compensating current according to the amplified detecting signal.

* * * * *